United States Patent [19]

Kusztos et al.

[11] Patent Number: 4,746,206

[45] Date of Patent: May 24, 1988

[54] MOTORCYCLE WITH AUTOMATICALLY ADJUSTABLE MIRROR TO REDUCE IMAGE MOVEMENT

[76] Inventors: John E. Kusztos, 15 Kingswharf Pl., Waldorf, Md. 20601; James Y. Pearce, 26 Seneca La., Stafford, Va. 22554

[21] Appl. No.: 929,301

[22] Filed: Nov. 12, 1986

[51] Int. Cl.$^4$ .............................. B60R 1/06; G02B 7/18; G02B 5/08; G02B 27/64

[52] U.S. Cl. .................................... 350/605; 350/606; 350/636; 350/637; 350/500

[58] Field of Search ............... 350/500, 637, 605, 636, 350/634, 606

[56] References Cited

U.S. PATENT DOCUMENTS

| | | |
|---|---|---|
| 3,195,075 | 7/1965 | Veltrop . |
| 3,199,075 | 8/1965 | Simmons . |
| 3,383,154 | 5/1968 | Reed ..................................... 350/605 |
| 3,469,901 | 9/1969 | Cook et al. . |
| 3,640,609 | 2/1972 | McKee et al. . |
| 3,749,480 | 7/1973 | DeWitt et al. . |
| 3,762,795 | 10/1973 | Bezu ..................................... 350/500 |

FOREIGN PATENT DOCUMENTS

| | | | |
|---|---|---|---|
| 26036 | 3/1978 | Japan ................................... 350/637 |
| 53247 | 3/1984 | Japan ................................... 350/637 |
| 50833 | 3/1984 | Japan ................................... 350/637 |

*Primary Examiner*—Jon W. Henry
*Attorney, Agent, or Firm*—Beveridge, DeGrandi & Weilacher

[57] ABSTRACT

A motorcycle mirror mounting system that controls the position of the mirrors of a motorcycle during tilting and/or turning of the motorcycle. A tilt sensor detects the degree and direction of tilting of the motorcycle frame and provides data representative thereof to a central controller. In accordance with its adjustment determinations, the controller acts through one or more servo control circuits to continuously adjust the positions of the mirrors to maintain the mirrors in positions providing substantially the same view to the rear as during straight driving. Thus, an image that would normally appear near the center of a mirror during straight riding, and which would appear to move either to the left or right of, and toward either the upper or lower boundaries of, the mirror during tilting of the motorcycle, is maintained substantially at the center of the mirror. If the mirrors are mounted on the motorcycle handlebars, then a turn sensor senses the degree and direction of turning of the mirrors relative to the motorcycle frame and provides data representative thereof to the central controller which acts through the servo control circuits to adjust the mirror positions for the turning as well as the tilting.

13 Claims, 3 Drawing Sheets

MOTORCYCLE WITH AUTOMATICALLY ADJUSTABLE MIRROR TO REDUCE IMAGE MOVEMENT

BACKGROUND OF THE INVENTION

The present invention pertains to a motorcycle mirror mount that automatically adjusts the rear view mirrors of a motorcycle to present substantially the same view during tilting and turning of the motorcycle as during straight riding, regardless of the degree and direction of tilt or turn of the motorcycle.

Unlike automobiles and other vehicles that ride on three or more wheels, two-wheeled motorcycles, motorscooters and the like lean or tilt when the operator turns to the right or left, as when turning a corner, changing lanes on a highway, or simply following the curvature of a road. Motorcycles generally have rear view mirrors mounted on them to enable the operator to monitor traffic and road conditions behind him. During turns the motorcycle mirrors tilt with the frame of the motorcycle, with the result that one mirror is raised to an elevated position with respect to its position during straight riding while the other mirror is lowered. On some motorcycles, the mirrors are mounted on a wind fairing that is fixedly connected to the motorcycle frame. However, on other motorcycles the mirrors are mounted on the handlebars, with the result that when the front fork-handlebar assembly is turned to cause the motorcycle to turn, the mirrors are also turned with respect to the frame of the motorcycle.

Motorcycle operators often experience difficulty in detecting vehicles behind them, for example vehicles approaching the motorcycle from either the left rear or right rear. This problem is exacerbated as the motorcycle tilts during a turn. Due to the tilting the motorcycle operator has a significantly diminished view behind him. If the turn is great, with a high degree of tilting and/or turning, the operator cannot utilize conventionally mounted mirrors to see behind him, but instead must either turn his head or look beneath his arm on the side toward which his vehicle is tilting. Either of these maneuvers by the operator is difficult to execute while wearing a helmet. Moreover, both are unsafe, as they require a prolonged time without viewing the road ahead, as compared with a quick glance at the rear view mirrors. This situation is even worse when the mirrors are mounted on the motorcycle handlebars and so turn with respect to the motorcycle frame as the operator turns the front wheel of the motorcycle.

Adjustable mirror mounts are known for other vehicles. For example, U.S. Pat. No. 3,469,901 discloses an electrical system for automatically angularly adjusting the mirrors on the cab of a tractor trailer. A series of spaced electrical contacts is arranged on the fifth wheel of the tractor, while the kingpin plate of the trailer carries a conducting bar adapted to engage the contacts as the tractor turns with respect to the trailer. Contact between the various electrical contacts and the conductor bar causes activation of an electromagnetic device for pivoting or turning the rear view mirrors to provide the operator with an appropriate rear view both during straight driving and during turning.

U.S. Pat. No. 3,749,480 discloses another automatic tractor-trailer mirror rotation system, including a relative rotation sensor, an electronic signal generator, a motor, and control circuitry for coupling the motor to the signal generator and for providing a feedback signal to the signal generator. The system rotates either the right or the left rear view mirror relative to the right or left rear wheel as the tractor turns relative to the trailer. The system is said to be very simple to install without requiring substantial modification to the vehicle.

Other self-aligning rear view mirror systems are disclosed in, for example, U.S. Pat. Nos. 3,199,075; 3,383,154; and 3,640,609. U.S. Pat. No. 3,199,075 discloses a system which moves the mirror between predetermined positions in response to operation of the right or left turn signal indicator. U.S. Pat. No. 3,383,154 shows a mechanical arrangement, utilizing a weight, for moving the mirror according to a particular ratio between the arcuate motion of the weight and the arcuate motion of the mirror. U.S. Pat. No. 3,640,609 discloses a hydraulic system responsive to the rotation of a shaft in the vehicle steering column for controlling the mirror position.

SUMMARY OF THE INVENTION

The present invention is a motorcycle mirror mounting system that controls the position of the mirrors of a motorcycle during tilting and/or turning of the motorcycle. A tilt sensor detects the degree and direction of tilting of the motorcycle frame and provides data representative thereof to a central controller. In accordance with its adjustment determinations, the controller acts through one or more servo control circuits to continuously adjust the positions of the mirrors to maintain the mirrors in positions providing the motorcycle operator with substantially the same view to the rear during such tilting or turning as is provided during straight driving. Thus, an image that would normally appear near the center of a mirror during straight riding, and which would appear to move either to the left or right of, and toward either the upper or lower boundaries of, the mirror during tilting of the motorcycle, is maintained substantially at the center of the mirror.

The motorcycle mirror is mounted in a mirror mount, and a support locates the mirror a predetermined distance laterally ourwardly from the frame of the motorcycle in a predetermined position with respect to the motorcycle seat so that the mirror provides a selected rearward view. The mirror is pivotally mounted, permitting it to pivot with respect to the predetermined position. A tilt sensor is provided for sensing tilting of the motorcycle in relation to a vertical plane through the motorcycle frame. The tilt sensor output is applied to a central controller which controls the mirror position to continuously provide the motorcycle operator with a view to the rear that is substantially equivalent to the selected rearward view that is provided during straight riding with the mirror in the original predetermined position.

One embodiment of the mirror mounting system according to the present invention is particularly suited for use with handlebar mounted mirrors and includes a turn sensor for detecting rotational movement of the front fork-handlebar assembly of the motorcycle and the mirror with respect to a plane through the motorcycle frame. The central controller receives a data signal, derived from the degree and direction of turn sensed by the turn sensor, and in turn acts through one or more servo circuits to further adjust the mirrors according to the degree of turn.

The system can be entirely analog, or the sensor outputs can be converted to digital signals, permitting a microprocessor to be utilized as the central controller.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals. In the drawings:

DETAILED DESCRIPTION OF THE PREFERRED EMBODIMENTS OF THE PRESENT INVENTION

Figure 1:
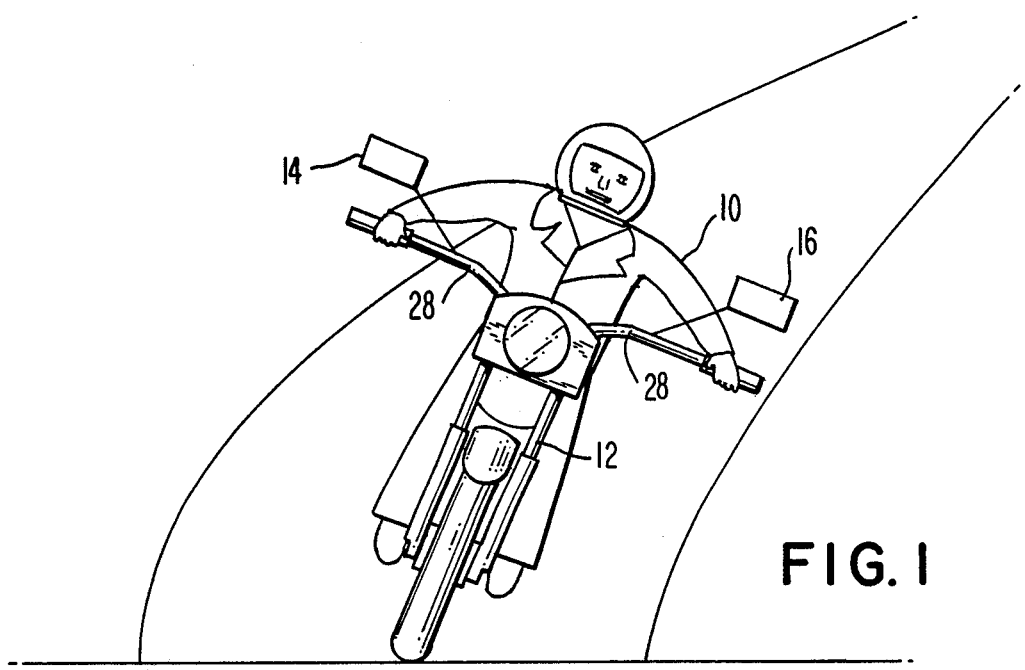
FIG. 1 is an elevational view depicting the negotiation of a curve in the road by a motorcycle during which the motorcycle and the operator tilt with respect to a vertical plane through the frame of the motorcycle.

As depicted in FIG. 1, as a motorcycle 12, with a motorcycle operator 10 riding thereon, turns to follow a curve or turn in a road, motorcycle 12 and rider 10 tilt from the vertical plane passing through the motorcycle frame. In contrast, during straight riding, the motorcycle and operator generally remain in a vertical plane. Motorcycle 12 is equipped with rear view mirrors 14 and 16.

Figure 2:
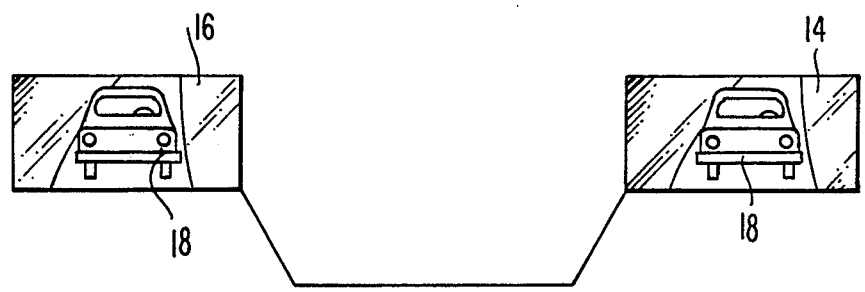
FIG. 2 is a diagrammatic illustration of the motorcycle operator's rear view in the mirrors of the motorcycle during straight riding.
Figure 3:
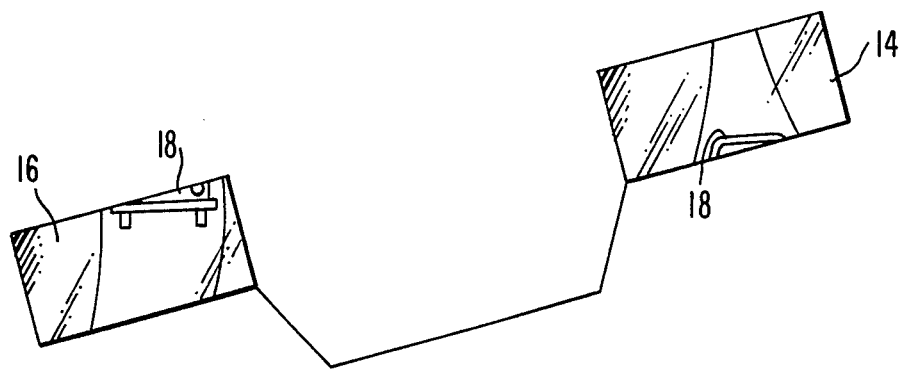
FIG. 3 is a diagrammatic illustration similar to FIG. 2, depicting the operator's rear view in conventionally mounted motorcycle mirrors when the motorcycle is tilted to the left such that the left side mirror dips and the right side mirror is elevated.

FIG. 2 illustrates the view provided to the operator by rear view mirrors 14 and 16 during straight riding. As illustrated, each of mirrors 14 and 16, at approximately the center thereof, shows an image 18 of a vehicle that is travelling behind the motorcycle. If mirrors 14 and 16 are mounted by means of conventional mirror mounts, as the motorcycle 12 tilts one of mirrors 14 and 16 is moved upwardly and the other is moved downwardly, both with respect to their FIG. 2 straight riding position. As a result, image 18 appears to move across the reflective surfaces of the mirrors and partially or fully to disappear. Thus, as illustrated in FIG. 3, when motorcycle 12 tilts to the left, right side mirror 14 moves upwardly and left side mirror 16 moves downwardly, and so image 18 moves to the lower right portion of mirror 14 and to the upper right portion of mirror 16, almost disappearing from the operator's view. The opposite situation occurs during tilting of the motorcycle to the right, causing right side mirror 14 to move downwardly and left side mirror 16 to move upwardly.

Figure 4:
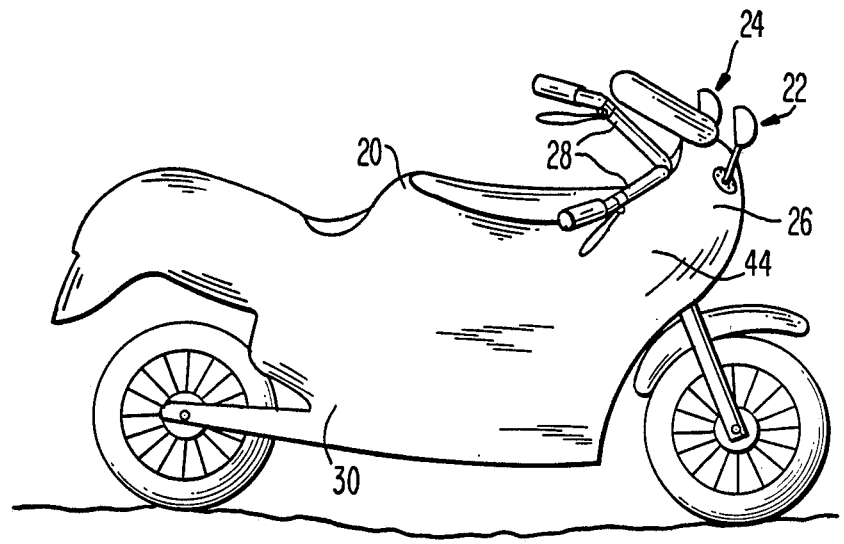
FIG. 4 is a perspective view of a motorcycle having a wind fairing and equipped with mirror mounts in accordance with one embodiment of the present invention.

FIG. 1 depicts mirrors 14 and 16 mounted on the handlebars 28 of motorcycle 12. In contrast, FIG. 4 is a perspective view of a motorcycle 20 having a wind fairing 26 in front of the handlebars 28 to reduce wind resistance, with mirror mounts 22 and 24 mounted on fairing 26. Handlebars 28 rotate within fairing 26 with respect to the fairing and the motorcycle frame 30; however, mirror mounts 22 and 24 and mirrors 14 and 16 do not rotate with the turning of the handlebars.

Figure 5:
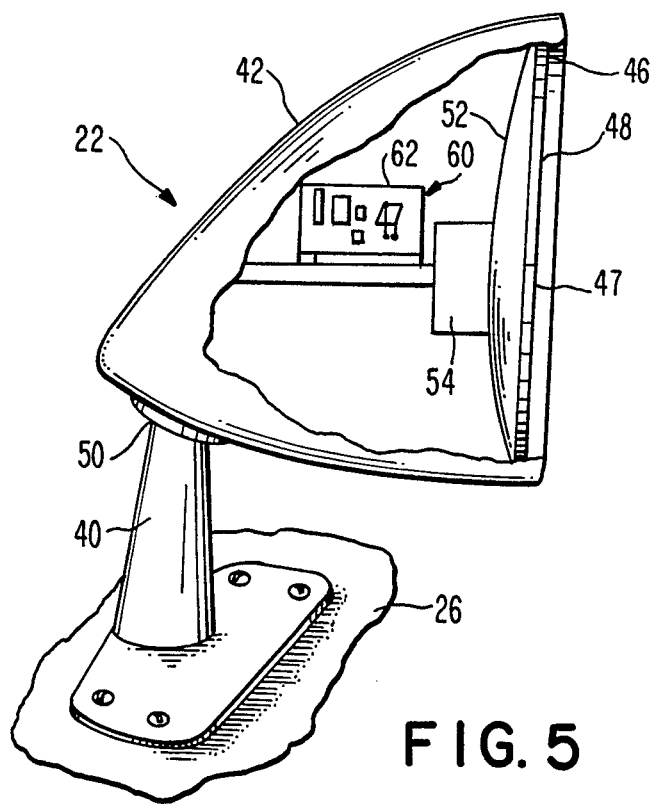
FIG. 5 is a cutaway, perspective view, in partial schematic form, of a motorcycle mirror mounting system in accordance with one embodiment of the present invention.

FIG. 5 is an enlarged, cutaway view in partial schematic form of mirror mount 22 in accordance with one embodiment of the present invention, and mirror mount 24 can be essentially the same. Mirror mount 22 includes a support element 40, for securing the mount to the motorcycle, and a housing 42. Support element 40 is sufficiently long to insure that housing 42 projects outwardly from the sidewalls 44 (FIG. 4) of fairing 26, for example being at least about six inches horizontally from the sidewall More preferably, support element 40 provides at least a six inch clearance between housing 42 and any point along frame 30.

Housing 42 may be of rounded, conical or any other shape and has an opening 46 accommodating a mirror assembly 47. Housing 42 is connected to support element 40 by means of swivel mount 50 which may be of any conventional type, preferably of the type permitting rough hand adjustment of the housing 42 and mirror 48 relative to element 40 and fairing 26. Mirror assembly 47 includes a mirror member 48 which is supported within housing 42 by a support plate 52. Support plate 52, in turn, is pivotably held within housing 42 by freely movable means such as universal joint 54. Universal joint 54 permits limited pivoting of mirror assembly 47 about orthogonal axes, for example the vertical and horizontal axes of support plate 52 and mirror member 48. Alternatively, support plate 52 could be held within housing 42 by means of a ball-and-socket joint affixed to the rear wall of housing 42 and permitting pivoting about the same axes.

Figure 6:
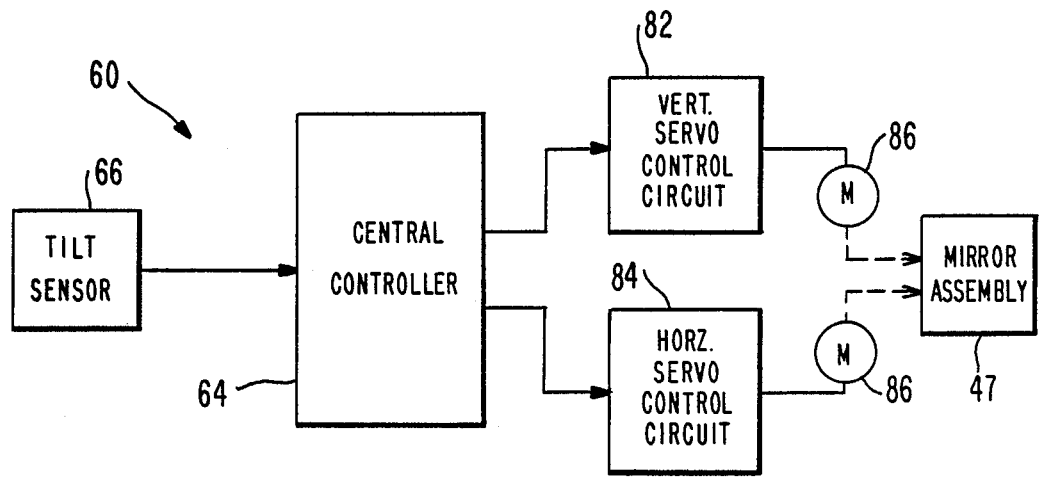
FIG. 6 is a block diagram of one embodiment of a system for controlling the position of the mirrors on a motorcycle, suitable for incorporation into the mirror mounting system of FIG. 5 in accordance with the present invention.

A control system 60 for mirror mount 22 or 24 is provided on a printed circuit board 62 positioned within housing 42. As seen in FIG. 6, control system 60 includes a central controller 64 for controlling the pivoting of plate 52 in response to the tilting of the motorcycle. Central controller 64 receives data representative of the direction of tilt and the degree of tilt from tilt sensor 66. By way of example, tilt sensor 66 could be of the gravity reference type. Accordingly, tilt sensor 66 could comprise a pendulous element suspended inside a case. Tilt sensor 66 provides an output signal, as from a potentiometer, dependent upon the deflection of the pendulous element from its vertical position when motorcycle 20 tilts to the right or to the left. By way of example, to differentiate between a right tilt and a left tilt, tilt sensor 66 could provide a positive going output signal to indicate a right tilt and a negative going output signal to indicate a left tilt.

Alternatively, tilt sensor 66 could comprise a gyro attitude transducer in which pivoting about a horizontally oriented gimbal axis is quantified to provide a similar output signal. Further still, tilt sensor 66 could comprise a mercury switch for providing a signal upon displacement of a mercury bubble either to the right or to the left within a containment tube having its longitudinal axis normally aligned with the horizontal when the motorcycle is vertical.

Controller 64 determines the adjustment necessary to mirror member 48 to provide a full rear view corresponding substantially to that provided during straight riding and applies appropriate signals to vertical and horizontal servo control circuits 82 and 84 to cause the servo control cicruits to control corresponding servo motors 86 to pivot plate 52 and mirror 48 about a pair of orthogonal axes of mirror assembly 47.

When system 60 is activated or when it is deactivated, or preferably both, as by the operation of the motorcycle ignition switch (not shown) by the motorcycle operator, controller 64 causes servo circuits 82 and 84 to control motors 86 and to automatically move mirror member 48 into an initial position, which preferably is a position providing a straight riding rear view for riders of average height. This initial position may be pre-set by the motorcycle operator by manual ad]ustment of housing 42 on swivel mount 52. Thereafter, system 60 maintains mirror member 48 in this straight riding position with respect to housing 42 during straight riding.

When tilt sensor 66 detects tilting of the motorcycle the tilt sensor generates a voltage signal indicating the detected direction and degree of tilting. This voltage signal is applied to controller 64, and in response controller 64 applies signals to servo control circuits 82 and 84 to cause motors 86 to move mirror member 48 to provide the requisite straight-riding view during the tilting. As a result, mirrors 14 and 16 are adjusted to center image 18 substantially at their central portions.

Figure 7:
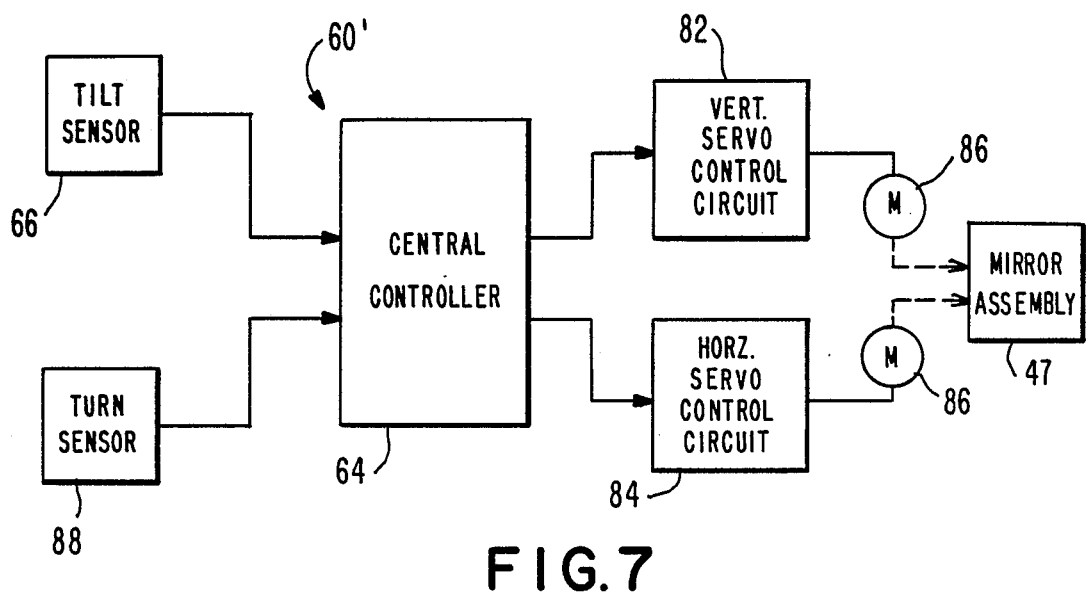
FIG. 7 is a block diagram of a second embodiment of a system in accordance with the present invention.

In the foregoing, each mirror mount has been described as being secured to fairing 26 of motorcycle 20 so as not to rotate with respect to frame 30 during turning of handlebars 28. Mirror mounts 22 and 24, however, could be secured to handlebars 28, as depicted in FIG. 1. FIG. 7 shows modified system 60' in accordance with the present invention which, in addition to the tilt circuitry of FIG. 6, includes turn sensor 88. Turn sensor 88 detects the relative rotation of handlebars 28 with respect to the motorcycle frame 30. Turn sensor 88 could comprise an electrical contact-based device that operates similar to the electrical contact-conduction bar turn sensor of U.S. Pat. No. 3,469,901. Alternatively, turn sensor 88 could comprise any other rotation sensing device as is known to those skilled in the art.

As with tilt sensor 66, turn sensor 88 applies a signal to controller 64 representing the degree and direction of rotation of handlebars 28 with respect to frame 30. Central controller 64 applies signals to servo control circuits 82 and 84 to cause motors 86 to pivot the mirror assembly 47 to compensate for the movement away from the straight riding view attributable to rotation of handlebars 28. Otherwise, system 60' is similar to system 60.

Central controller 64 and servo control circuits 82 and 84 can be conventional servomechanism control circuitry designed to control the position of mirror assembly 47 in response to the output from tilt sensor 66 and/or turn sensor 88. See, for example, the two-volume treatise *Servomechanism and Regulating System Design,* Chestnut and Mayer, John Wiley & Sons, Inc., Second Edition, 1959. Alternatively, central controller 64 can include a microprocessor, in which event central controller 64 also might include an analog to digital converter between tilt sensor 66 and the microprocessor and between turn sensor 88 and the microprocessor.

Although the present invention has been described with reference to preferred embodiments, numerous modifications, rearrangements, and substitutions could be made, and the result would remain well within the scope of the invention.

What is claimed is:

1. In combination with a motorcyle, a motorcycle mirror mount for automatically positioning a rear view mirror of the motorcycle to reduce movement of the image of nearby objects in the rear view provided by the mirror to an operator on the motorcycle during sideways tilting of the motorcycle, said mirror mount comprising:

a mirror;

support means;

means for attaching said support means on the motorcycle;

means for mounting said mirror to said support means while permitting pivoting of said mirror relative to said support means about a pair of genreally orthogonal axes to position said mirror to provide to the motorcycle operatior an image of nearby objects to the rear of the motorcycle;

tilt sensing means for sensing tilting of the mirror and providing a signal representative of the direction and degree of the sensed tilting; and control means responsive to the signal from said tilt sensing means for pivoting said mirror relative to said support means to a position reducing movement of the image of the nearby objects, as viewed by the motorcycle operator, thereby providing to the motorcycle operator substantially the same view of the nearby objects regardless of the direction and degree of sideways tilting.

2. The combination of claim 1 further comprising turn sensing means of sensing turning of said mirror about an axis substantially normal to the longitudinal direction of the motorcycle frame and lying in a vertical plane extending longitudinally through the motorcycle frame and providing a signal representative of the direction and degree of the sensed turning; and wherein said control means is further responsive to the signal from said turn sensing means for pivoting said mirror relative to said support means to a position reducing movement of the image of the nearby objects as viewed by the motorcycle operator, thereby providing to the motorcycle operator substantially the same view of the nearby objects regardless of the direction and degree of turning.

3. The combination of claim 2 wherein said attaching means attaches said support means to the handlebar of the motorcycle.

4. The combination of claim 2 wherein said control means comprises an analog to digital converter for converting the representative signal to digital signals, and digital processing means for processing the digital signals to provide signals for controlling the pivoting.

5. The combination of claim 4 wherein said digital processing means comprises a microprocessor.

6. The combination of in claim 1 wherein said attaching means attaches said support means to a wind fairing of the motorcycle.

7. The combination of in claim 1 wherein said control means comprises an analog to digital converter for converting the representative signal to a digital signal and digital processing means for processing the digital signal to provide signals for controlling the pivoting.

8. The combination of claim 7 wherein said digital processing means comprises a microprocessor.

9. The combination of claim 1 wherein said support means comprises a housing and wherein said control means is within said housing.

10. The combination of claim 9 wherein said tilt sensing means is within said housing.

11. The combination of claim 1 wherein at least one of said support means, said attaching means, and said mounting means includes means permitting manual pivoting of said mirror relative to the motorcycle, for positioning said mirror in an initial position.

12. The combination of claim 11 wherein said control means includes means responsive to at least one of activation of said control means and deactivation of said control means for positioning said mirror in the initial position.

13. The combination of claim 1 wherein said control means includes means responsive to at least one of activation of said control means and deactivation of said control means for positioning said mirror in a predetermined position.

* * * * *